US009953666B2

(12) United States Patent
Unger et al.

(10) Patent No.: US 9,953,666 B2
(45) Date of Patent: Apr. 24, 2018

(54) GIMBAL DEFLECTION INHIBITOR FOR HEAD GIMBAL ASSEMBLY

(71) Applicant: Seagate Technology LLC, Cupertino, CA (US)

(72) Inventors: Christopher Unger, Chanhassen, MN (US); Ravishankar Shivarama, Eden Prairie, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/944,639

(22) Filed: Nov. 18, 2015

(65) Prior Publication Data

US 2017/0140782 A1   May 18, 2017

(51) Int. Cl.
*G11B 5/48* (2006.01)

(52) U.S. Cl.
CPC .......... *G11B 5/4826* (2013.01); *G11B 5/4853* (2013.01); *Y10T 29/4903* (2015.01)

(58) Field of Classification Search
None
See application file for complete search history.

(56) References Cited

U.S. PATENT DOCUMENTS

| | | | | |
|---|---|---|---|---|
| 5,608,590 A | * | 3/1997 | Ziegler et al. | G11B 5/4826 360/245.1 |
| 5,696,651 A | * | 12/1997 | Endo et al. | G11B 5/4826 360/245.8 |
| 5,880,908 A | * | 3/1999 | Shiraishi et al. | G11B 5/4826 360/234.6 |
| 6,078,472 A | * | 6/2000 | Mitoh et al. | G11B 5/4853 360/245.4 |
| 6,700,746 B1 | | 3/2004 | Brandt et al. | |
| 6,801,398 B1 | * | 10/2004 | Ohwe et al. | G11B 5/4853 360/234.6 |
| 7,002,780 B2 | * | 2/2006 | Rancour et al. | G11B 5/4826 360/234.6 |
| 7,006,330 B1 | * | 2/2006 | Subrahmanyam et al. | G11B 5/4826 360/234.5 |
| 7,474,508 B1 | * | 1/2009 | Li et al. | G11B 5/4826 360/245.2 |
| 7,633,716 B2 | * | 12/2009 | Watanabe | G11B 5/4826 360/234.6 |
| 7,729,089 B1 | * | 6/2010 | Hogan | G11B 5/4826 360/234.6 |
| 7,995,310 B1 | * | 8/2011 | Pan | G11B 5/4826 360/234.6 |
| 2006/0203389 A1 | * | 9/2006 | Motonishi | G11B 5/4826 360/234.6 |
| 2015/0170689 A1 | * | 6/2015 | Stephan et al. | G11B 5/4826 360/234.7 |

\* cited by examiner

*Primary Examiner* — Craig A. Renner
(74) *Attorney, Agent, or Firm* — Kagan Binder, PLLC

(57) ABSTRACT

A method for assembling a head-gimbal assembly of a hard disk drive, the method including the steps of dispensing adhesive onto a top surface of a gimbal tongue, wherein the gimbal tongue is positioned adjacent to a load beam with a dimple extending from its top surface, and wherein the gimbal tongue is configured with at least one support feature that inhibits its deformation toward the dimple when subjected to downward pressure with respect to the dimple; positioning a slider on which a magnetic head is mounted adjacent to the top surface of the gimbal tongue; and pressing the slider onto the adhesive and toward the dimple of the load beam.

9 Claims, 7 Drawing Sheets

US 9,953,666 B2

GIMBAL DEFLECTION INHIBITOR FOR HEAD GIMBAL ASSEMBLY

BACKGROUND

Many computers utilize disk drives for data storage and retrieval, such as magnetic recording hard disk drives that utilize a head assembly for reading and/or writing data on a rotatable magnetic disk. In such systems, the head assembly is typically attached to an actuator arm by a head suspension assembly comprising a head suspension and an aerodynamically designed slider onto which a read/write head is provided. When the head is positioned over a spinning disk during usage, the head position is at least partially controlled by balancing a lift force that is caused by an air bearing generated by the spinning disk and acting upon the slider, and an opposite bias force of the head suspension. In operation, the slider and head are designed to "fly" over the spinning disk at high speeds and at precisely determined distances from the disk surface.

Head suspensions generally include an elongated load beam with a gimbal flexure located at a distal end of the load beam, and a base plate or other mounting means at a proximal end of the load beam. The gimbal flexure includes spring or gimbal arms that support a platform or tongue to which the slider is mounted. During operation of such a disk drive, the gimbal arms permit the slider to pitch and roll about a load dimple or load point of the load beam, thereby allowing the slider to follow the surface of the disk as it rotates.

Current processes for attaching a slider to an area of a gimbal, such as a gimbal tongue, involve dispensing adhesive onto a location of a gimbal that is positioned adjacent to a load dimple of a load beam. The slider is then placed on the adhesive and pressed downwardly onto the gimbal material. This downward force deforms the relatively thin gimbal material over the load dimple. Because the gimbal material is at least somewhat elastic, removal of the downward force on the slider allows the gimbal to return to its original shape, which can leave undesirable gaps or voids in the adhesive between the slider and the gimbal. In addition, this assembly process can cause excess adhesive to move outwardly toward and past the outer edges of the slider, which can transfer to tooling and/or otherwise contaminate the processing equipment that is being used for placement of subsequent sliders.

There is therefore a need to provide methods and equipment for attachment of sliders to gimbal structures that reduce the amount of elastic deformation of the gimbal material. Such methods and equipment can desirably minimize or eliminate the presence of adhesive gaps or voids and also provide a reliable process that keeps adhesive from moving past the sides of the slider and onto processing equipment.

SUMMARY

Aspects of the invention described herein are directed to the attachment of sliders onto a gimbal surface during the process of manufacturing head assemblies for magnetic recording hard disk drives. In particular, aspects of the invention are directed to providing support to minimize or eliminate flexing of the gimbal material when attaching a slider to a gimbal surface. Various configurations for accomplishing this are contemplated within the methods of the invention.

In one aspect of the invention, a method is provided for assembling a head-gimbal assembly of a hard disk drive, the method including the steps of dispensing adhesive onto a top surface of a gimbal tongue, wherein the gimbal tongue is positioned adjacent to a load beam with a dimple extending from its top surface, and wherein the gimbal tongue is configured with at least one support feature that inhibits its deformation toward the dimple when subjected to downward pressure with respect to the dimple; positioning a slider on which a magnetic head is mounted adjacent to the top surface of the gimbal tongue; and pressing the slider onto the adhesive and toward the dimple of the load beam.

These and various other features and advantages will be apparent from a reading of the following detailed description.

BRIEF DESCRIPTION OF THE DRAWINGS

The present invention will be further explained with reference to the appended Figures, wherein like structure is referred to by like numerals throughout the several views, and wherein.

DETAILED DESCRIPTION

Figure 1:
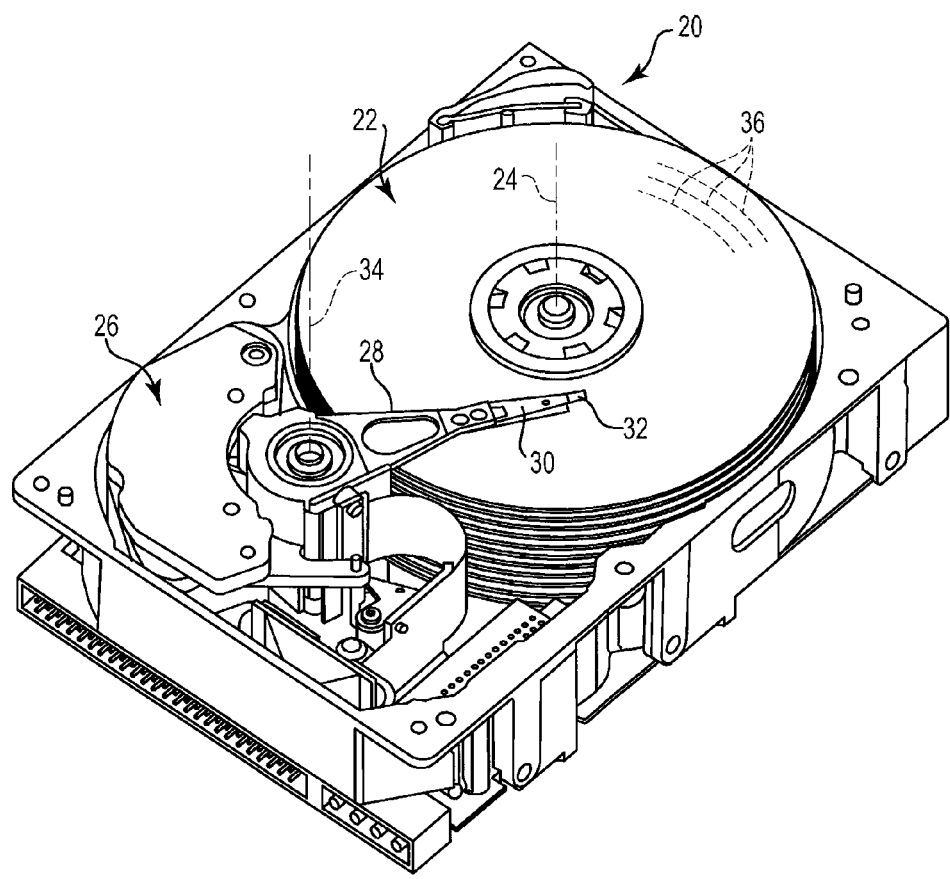
FIG. 1 is a perspective view of an exemplary hard disk drive (HDD) system.

Referring now to the Figures, wherein the components are labeled with like numerals throughout the several Figures, and initially to FIG. 1, an exemplary configuration of a typical hard disk drive (HDD) system 20 is illustrated. The HDD system generally includes at least one magnetic storage disk 22 configured to rotate about an axis 24, an actuation motor 26 (e.g., a voice coil motor), an actuator arm 28, a suspension assembly 30 that includes a load beam, and a slider 32 carrying a transducing or read/write head (not shown). Slider 32 is supported by suspension assembly 30, which in turn is supported by actuator arm 28. Together, actuator arm 28, suspension assembly 30 and slider 32 form a head stack assembly (HSA). Actuation motor 26 is configured to pivot actuator arm 28 about an axis 34, in order to sweep suspension 30 and slider 32 in an arc across a surface of rotating disk 22 with slider 32 "sliding" or "flying" across disk 22 on a cushion of air, often referred to as an air bearing. The read/write head carried by slider 32 can be positioned relative to selected concentric data tracks 36 of disk 22 by a piezoelectric microactuator, not seen in FIG. 1. A stack of co-rotating disks 22 can be provided with additional actuator arms 28, suspension assemblies 30, and sliders 32 that carry read/write heads for reading and writing at top and bottom surfaces of each disk 22 in the stack.

Figure 2:
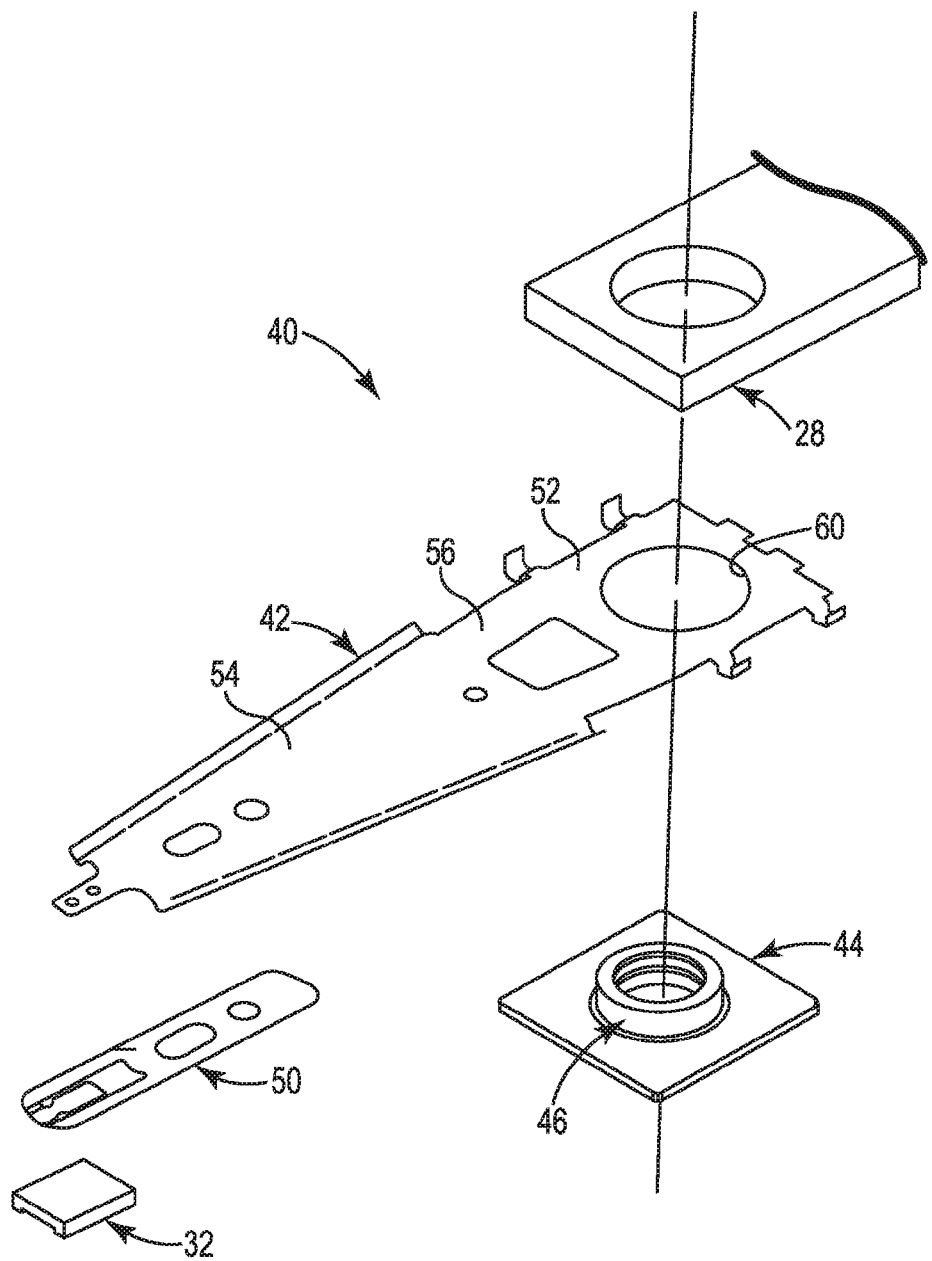
FIG. 2 is a perspective view of an exploded head stack assembly of the type that can be used in a hard disk drive system, such as the system illustrated in FIG. 1.

In order to better illustrate sliders and associated components of the type discussed herein relative to the invention, FIG. 2 provides an exploded, perspective view of a typical head stack assembly (HSA) 40 of FIG. 1, which includes a load beam 42, actuator arm 28, and a base plate 44 with an upwardly projecting boss tower 46. In the illustrated embodiment, HSA 40 includes a flexure piece 50 to which slider 32 (which includes a transducing or read/write head) is mountable. Flexure 50 may be attached to load beam 42 by any conventional mechanism or may be integral with load beam 42. In some embodiments, load beam 42, flexure 50 and slider 32 can be referred to as a head suspension assembly. Load beam 42 includes a mounting region 52 at a proximal end, a rigid region 54 adjacent to the distal end of the load beam 42, and a spring region 56 between the mounting region 52 and rigid region 54. An aperture 60 is extends through the mounting region 52. Spring region 56 is relatively resilient and provides a downward bias force at the distal tip of load beam 42 for holding the slider 32 with read/write head near a spinning disk in opposition to an upward force created by the air bearing over the disk. HSA 40 is typically coupled to actuation motor 26 of the type illustrated in FIG. 1, for example, via actuator arm 28 that is attached to mounting region 52 of load beam 42.

Figure 3:
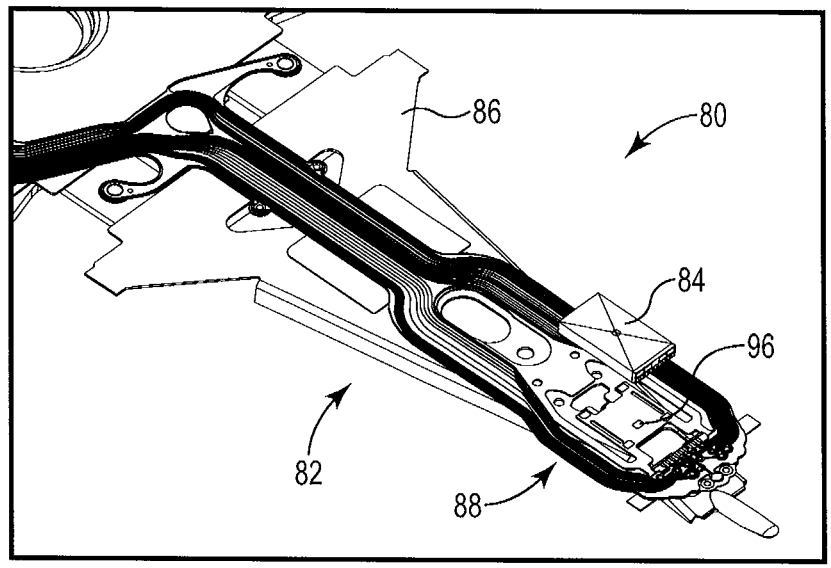
FIG. 3 is a perspective view of a load beam area of a hard disk drive system.
Figure 4:
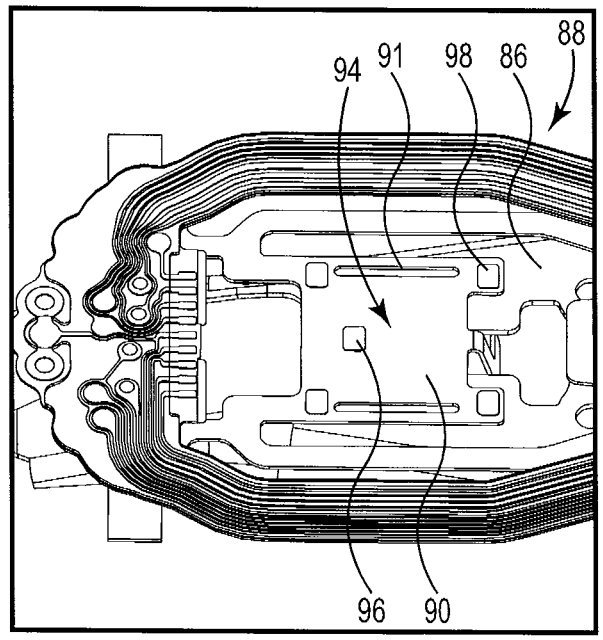
FIG. 4 is a top view of the gimbal area as positioned relative to a load beam of FIG. 3.

The read/write heads described above are carried by a slider that is used to read from and write to a data track on a disk. The slider is carried by an arm assembly that includes an actuator arm and a suspension assembly, which can include a separate gimbal structure or can integrally form a gimbal. FIG. 3 illustrates an exemplary configuration of a head gimbal assembly 80, which includes a trace gimbal assembly 82 to which a slider 84 is mounted. The trace gimbal assembly 82 includes a load beam 86 (which may be made of stainless steel, for example) which is attached to a gimbal area 88 (which may be made of one or more materials such as stainless steel, polyamide, copper, nickel, and/or gold). FIG. 4 illustrates the gimbal area 88 positioned relative to load beam 86 in further detail, including a gimbal 90 having slots 91 extending therethrough. An area in which adhesive will be dispensed to secure a slider to the gimbal 90 (e.g. a gimbal tongue) is indicated generally by reference number 94.

With continued reference to FIGS. 3 and 4, the illustrated portions of head gimbal assembly 80 include multiple pedestals or "stand-offs" 98 spaced from each other and arranged to generally define the four corners of a square or rectangular configuration. It is understood, however, that the configuration of stand-offs 98 can be different from shown, including the use of more or less than four of such structures, which can be arranged differently than shown. In an exemplary embodiment, these stand-offs 98 have generally the same thickness as each other for a particular assembly, and can be comprised of the same materials (which can be beneficial for ease in manufacturing, as well as performance of the assembly 80) or different materials. Each of the stand-offs 98 are also shown in this drawing as having the same rectangular shape, although it is contemplated that they can have a different shape than rectangular, and/or that one or more of the stand-offs can have a different shape from the other stand-offs for a particular assembly 80.

In any case, the assembly 80 further includes an auxiliary or additional pedestal 96 that is located in the area designated by reference numeral 94. This pedestal 96 is also shown as having a size and rectangular shape that are generally the same as the stand-offs 98, although it can instead have a different size and or shape from at least one of the stand-offs 98. In accordance with the invention, the pedestal 96 is positioned in such a way that the area of the gimbal tongue from which it extends will restrict the elastic deformation of the gimbal tongue in the area where a dimple is located, as is described in further detail below.

It is noted that the slots 91 that extend through the gimbal 90 can be specifically sized and/or shaped to be a type of "stop" that limits the movement of adhesive outwardly and past the sides of the gimbal 90 while the components are being pressed toward each other during an assembly process. That is, during compression of the components toward each other with liquid adhesive between them, adhesive will move outwardly until it reaches the area of the slots 91. At this point, any excess adhesive will begin to fill one or more of the slots 91. Only when one or more of these slots are filled with adhesive will the adhesive be able to move further outwardly and past the components.

Figure 8A:
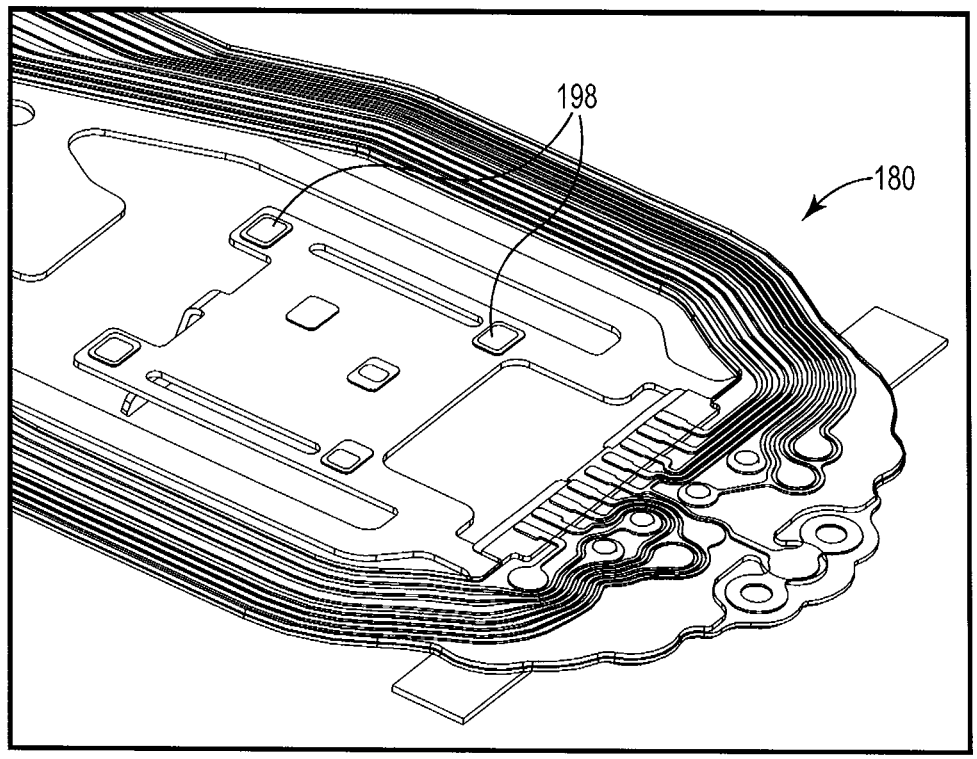
FIGS. 8A and 8B are front and rear perspective views of a portion of a load beam area of a hard disk drive system of the invention.
Figure 8B:
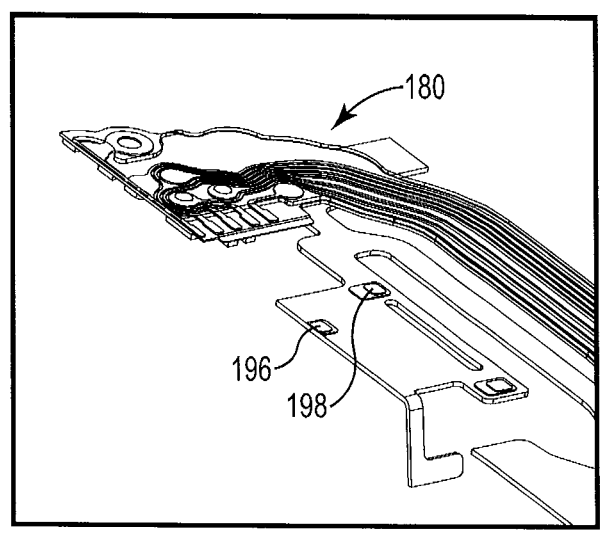

Referring additionally to FIGS. 8A-8B, an exemplary configuration of a head gimbal assembly 180 is illustrated, which includes pedestals or "stand-offs" 198, along with an additional pedestal or "stand-off" 196 that is positioned in the area where adhesive will be dispensed. Each of the stand-offs 196, 198 is shown in this embodiment as comprising two layers, wherein the top layer is at least slightly smaller than the bottom layer. In an exemplary embodiment, the bottom layer is polyamide and the top layer is copper, although its multiple layers can instead be made of different materials. It is also contemplated that the stand-offs 196, 198 are made of less or more than two materials, wherein when a third coat is used, it may be made out of a material known as "Covercoat," for example. As was discussed above relative to FIGS. 3 and 4, the exemplary embodiment of FIGS. 8A and 8B can include stand-offs that have the same or different shape from each other, and can be arranged in a configuration that is the same or at least somewhat different than the illustrations.

Figure 5:
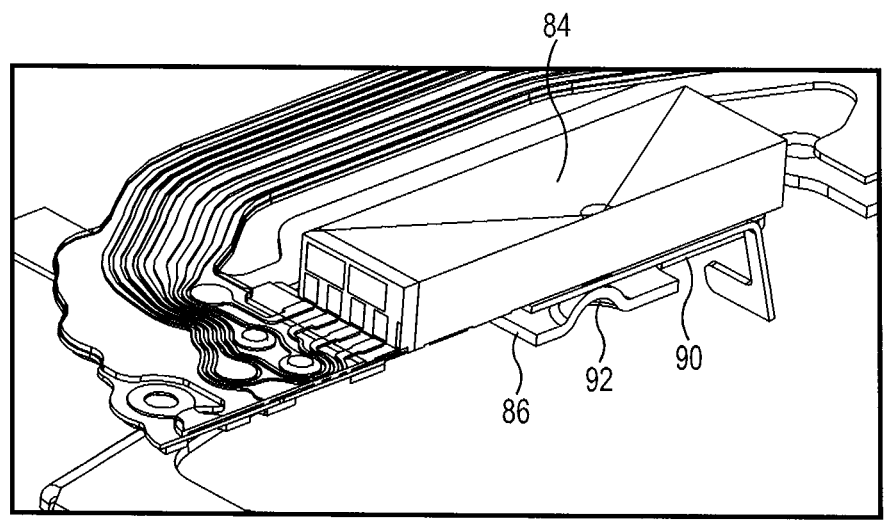
FIG. 5 is a perspective, partial cross-sectional view of a load beam having a dimple as positioned relative to a slider mounted to a gimbal.

FIG. 5 illustrates a perspective, cross-sectional view of a portion of head gimbal assembly 80, which illustrates the portion of load beam 86 that includes a dimple 92. As is also shown in this figure, the slider 84 is attached to the gimbal 90 such that the slider 84 is positioned directly above the dimple 92. The dimple 92 provides the surface about which the slider 84 can pitch and roll during operation of the disk drive. In typical assembly operations for attaching such a slider to a gimbal, adhesive is placed on an upper surface of a gimbal, which in turn is positioned adjacent to a dimple of a load beam. The adhesive is positioned generally above the dimple. The slider is then pressed onto the adhesive and toward the dimple, which causes the relatively thin gimbal material to deform. Because the gimbal deformation is elastic, as the force on the slider is removed, the gimbal returns to its original shape, which can leave voids in the adhesive. In addition, the deformation of the gimbal can cause excess adhesive to be pushed to and past the edges of the slider. Because the sliders are often placed using mounting equipment that grips the sides of the slider, this excess adhesive can move out from between the slider and gimbal and up the side of the slider and onto the mounting equipment. Such adhesive could then be transferred by the mounting equipment onto subsequent sliders, which is undesirable and can cause excessive downtime for the manufacturing process due to the need to clean the mounting equipment.

Figure 6A:
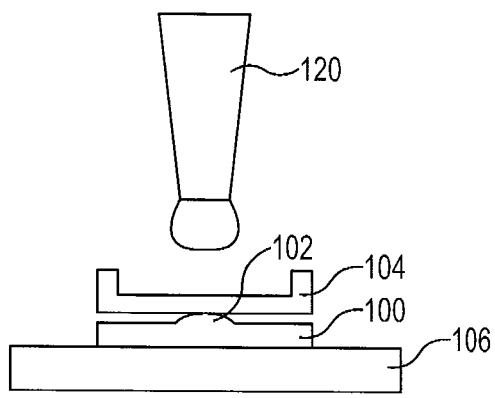
FIGS. 6A-6C are schematic side views of sequential steps of placing adhesive onto a gimbal tongue surface, in accordance with the invention.
Figure 6B:
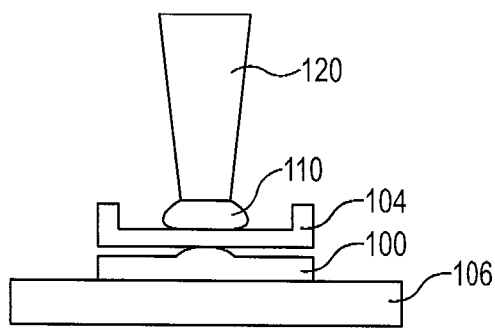
Figure 6C:
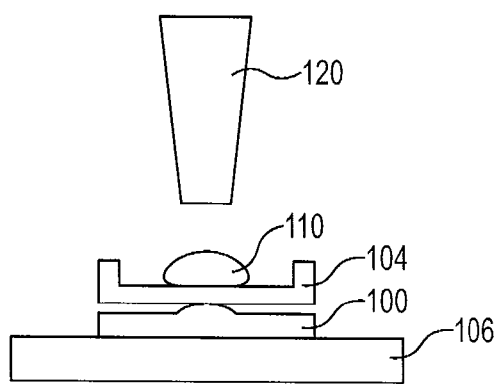

In accordance with an exemplary method and configuration of the invention, a sequence of steps for placement of adhesive onto a gimbal tongue surface is illustrated in FIGS. 6A-6C. Each of these figures shows a portion of a head gimbal assembly that includes a load beam 100 having a dimple 102, above which a portion of a gimbal tongue 104 is positioned. Trace gimbal assembly support tooling 106 is provided adjacent to the opposite side of the load beam 100 from which the dimple 102 extends. In accordance with the invention, the area of the gimbal tongue 104 includes at least one support feature or "stand-off" that restricts the elastic deformation of the gimbal tongue 104 in the area where the dimple 102 is located. Such a support feature may be a polyimide feature, for example, and may be made of a single layer or multiple layers of material. These materials can include polyamide, copper, gold, covercoat, and/or other materials, either alone or in combination with each other, as is described above relative to FIGS. 3, 4, and 8A-8B.

With continued reference to FIGS. 6A-6C, an adhesive dispensing mechanism 120 is positioned above the gimbal tongue 104 in a desired area where adhesive is to be placed, as shown in FIG. 6A. The dispenser 120 can be any device or system that can quickly and accurately place a predetermined amount of adhesive in a desired location. FIG. 6B illustrates the dispenser 120 as it is placing a quantity of adhesive 110 on a top surface of the gimbal tongue 104. This figure shows the dispenser 120 as it has moved into contact with the adhesive 110 that is also in contact with the gimbal tongue 104; however, it is contemplated that the dispenser 120 instead deposits the adhesive 110 from a fixed distance above the gimbal tongue 104 such that the dispenser releases the adhesive 110 prior to it contacting the gimbal tongue 104. In any case, the adhesive 110 is deposited in the area of the gimbal tongue 104 that includes the support feature(s) discussed above that minimize or prevent deflection of the gimbal tongue 104.

Figure 7A:
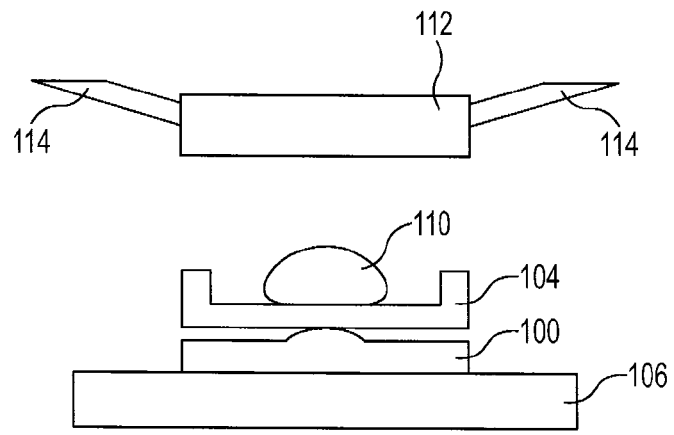
FIGS. 7A-7C are schematic side views of sequential steps of positioning a slider on adhesive that has been placed on a top surface of a gimbal tongue, in accordance with the invention.
Figure 7B:
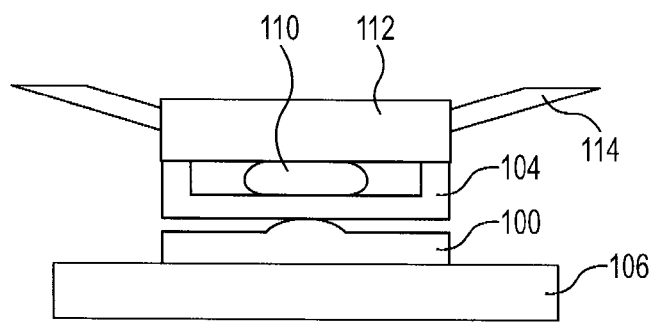
Figure 7C:
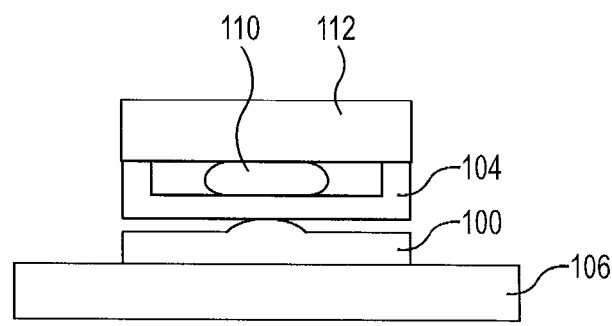

FIGS. 7A-7C are schematic side views of sequential steps of positioning a slider 112 on adhesive 110 that has been placed on a top surface of a gimbal tongue 104, in accordance with the invention. As shown, the slider 112 is being held on its sides by mounting fingers 114. The fingers 114 move downwardly and toward the gimbal tongue 104 in the location of the adhesive 110. The fingers 114 will continue to move toward the gimbal tongue 104 until the bottom surface of the slider 112 contacts the adhesive 110 so that the adhesive 110 spreads out at least slightly across the surface of the gimbal tongue 104. Due to the support feature(s) provided on the gimbal tongue 104, the deflection of the tongue is minimized.

The present invention has now been described with reference to several embodiments thereof. The foregoing detailed description and examples have been given for clarity of understanding only. No unnecessary limitations are to be understood therefrom. It will be apparent to those skilled in the art that many changes can be made in the embodiments described without departing from the scope of the invention. The implementations described above and other implementations are within the scope of the following claims.

What is claimed is:

1. A method of assembling a head-gimbal assembly of a hard disk drive, the method comprising the steps of:
   dispensing adhesive onto a top surface of a gimbal tongue having a length extending parallel to a longitudinal axis of the head-gimbal assembly, wherein the gimbal tongue is positioned adjacent to a dimple extending from a top surface of a load beam toward a bottom surface of the gimbal tongue, and wherein the gimbal tongue comprises:
   at least three pedestals extending upwardly from the top surface of the gimbal tongue and defining multiple points of a representative perimeter shape; and
   at least one support feature extending upwardly from the top surface of the gimbal tongue to inhibit deflection of the gimbal tongue when subjected to downward pressure with respect to the dimple, wherein the at least one support feature is positioned entirely within the representative perimeter shape defined by the at least three pedestals;
   wherein the adhesive is dispensed entirely within the representative perimeter shape defined by the at least three pedestals; and
   wherein the gimbal tongue comprises first and second edges extending along the length of the gimbal tongue, and at least one slot extending along and adjacent to at least one of the first and second edges and positioned between two adjacent pedestals of the at least three pedestals;
   positioning a slider on which a magnetic head is mounted adjacent to the top surface of the gimbal tongue, the at least three pedestals, and the at least one support feature; and
   pressing the slider onto the adhesive and toward the dimple of the load beam.

2. The method of claim 1, wherein the at least one support feature comprises at least one material layer.

3. The method of claim 1, wherein the at least one slot comprises a first slot adjacent to the first edge and a second slot adjacent to the second edge, wherein the at least one support feature is positioned between the first and second slots.

4. The method of claim 1, wherein the at least one support feature comprises a different size and shape from at least one of the pedestals.

5. The method of claim 1, wherein the at least one support feature comprises the same size and shape of each of the at least three pedestals.

6. A method of assembling a head-gimbal assembly of a hard disk drive, the method comprising the steps of:
   dispensing adhesive onto a top surface of a gimbal tongue, wherein the gimbal tongue is positioned adjacent to a dimple extending from a top surface of a load beam toward a bottom surface of the gimbal tongue, and wherein the gimbal tongue comprises:
   at least three pedestals extending upwardly from the top surface of the gimbal tongue and defining multiple points of a representative perimeter shape; and
   at least one support feature extending upwardly from the top surface of the gimbal tongue to inhibit deflection of the gimbal tongue when subjected to downward pressure with respect to the dimple, wherein the at least one support feature is positioned entirely within the representative perimeter shape defined by the at least three pedestals, and wherein the at least one support feature comprises a copper layer and a polyimide layer;
   wherein the adhesive is dispensed entirely within the representative perimeter shape defined by the at least three pedestals;
   positioning a slider on which a magnetic head is mounted adjacent to the top surface of the gimbal tongue, the at least three pedestals, and the at least one support feature; and
   pressing the slider onto the adhesive and toward the dimple of the load beam.

7. The method of claim 6, wherein the at least one support feature further comprises a third layer adjacent to one of the copper layer and the polyimide layer.

8. The method of claim 6, wherein the at least one support feature comprises a different size and shape from at least one of the pedestals.

9. The method of claim 6, wherein the at least one support feature comprises the same size and shape of each of the at least three pedestals.

* * * * *